United States Patent [19]

Facchini

[11] Patent Number: 4,943,227

[45] Date of Patent: Jul. 24, 1990

[54] COMPRESSING MACHINE FOR MAKING TABLETS

[75] Inventor: Libero Facchini, Bologna, Italy

[73] Assignee: I.M.A. Industria Macchine Automatiche S.p.A., Bologna, Italy

[21] Appl. No.: 286,160

[22] Filed: Dec. 19, 1988

[30] Foreign Application Priority Data

Dec. 30, 1987 [IT] Italy ................................ 3746 A/87

[51] Int. Cl.[5] ........................ B29C 39/08; B29C 39/36

[52] U.S. Cl. .................................... 425/345; 425/353; 425/434; 425/444; 425/DIG. 35; 264/311

[58] Field of Search ............... 425/344, 345, 256, 353, 425/354, 355, 359, 361, DIG. 35, 348, 425, 434, 444; 264/311

[56] References Cited

U.S. PATENT DOCUMENTS

| | | | |
|---|---|---|---|
| 2,700,938 | 2/1955 | Wolff et al. | 425/345 |
| 2,989,781 | 6/1961 | Frank | 425/345 |
| 3,677,673 | 7/1972 | Shapiro | 425/345 |
| 3,999,922 | 12/1976 | Shimada | 425/345 |
| 4,057,301 | 11/1977 | Korsch | 425/345 |
| 4,094,624 | 6/1978 | Halm | 264/311 |
| 4,108,338 | 8/1978 | Howland et al. | 425/353 |
| 4,294,792 | 10/1981 | Arons et al. | 264/311 |
| 4,403,935 | 9/1983 | Crossley et al. | 425/345 |
| 4,408,975 | 10/1983 | Hack | 425/345 |
| 4,478,567 | 10/1984 | Scheer | 264/311 |

FOREIGN PATENT DOCUMENTS

| | | | |
|---|---|---|---|
| 60-36115 | 2/1985 | Japan | 264/311 |
| 1481790 | 8/1970 | United Kingdom . | |
| 1481797 | 8/1977 | United Kingdom . | |

*Primary Examiner*—Jay H. Woo

*Assistant Examiner*—K. P. Nguyen

*Attorney, Agent, or Firm*—Stevens, Davis, Miller & Mosher

[57] ABSTRACT

A tablet making machine consisting of a turret, which rotates relative to its axis, containing a coaxial cylindrical chamber closed at the inside end and supplied with material in a powder or granular form, an annular plate locked to the turret in which there are cavities whose axes are parallel to the turret axis, equidistant from the turret axis and angularly equidistant, opposing heads of a pair of corresponding punches occupying each cavity; the punches being axially guided by housings made in the turret and movable upwardly and downwardly to determine the mutual distance between the working heads, the cavities being infed with material through corresponding infeed channels, connecting the cavities with the chamber, in an equal number of radial directions with respect to the axis of the turret.

5 Claims, 3 Drawing Sheets

COMPRESSING MACHINE FOR MAKING TABLETS

BACKGROUND OF THE INVENTION

The invention relates to a compressing machine for making tablets with powder or granular material.

DESCRIPTION OF THE PRIOR ART

Known compressing machines for making tablets, consist of a turret, driven to rotate around its vertical axis, fitted with a cavity plate located near the central part of the same turret and coaxial to the latter.

The cavities in this table consist of holes with axes distributed along a circumference coaxial to the turret, parallel to the axis of the latter and, finally, angularly equidistant from one another.

Each cavity has two associated punches, above and below, guided by their respective housings made in the said turret coaxially to the aforementioned cavity.

The working heads of each pair of punches are opposing and of such a diameter that they fit, from opposite sides, into the corresponding cavity.

The upper part of the cavities opens into a plate, normal to the turret axis; this plate is associated with the station for tablet expulsion from the cavities and the station for infeed of the material to be compressed, with the latter supplied in powder or granular form.

As is known the production of a tablet using a compressing machine, involves, in order, the loading of the cavity with powder or granular material, the volumetric dosing of material in this cavity, the precompression of the material and subsequent compression of the same with consequent forming of a tablet of a pre-established thickness, and finally the expulsion from the cavity of the tablet thus formed.

The stages described are completed, in order, along a preset arc described by each cavity, in particular a full circle.

The mutual distance between the working heads of the punches is determined, as regards the expulsion stations, cavity loading, volumetric dosage of the material present in the cavity, by operating means associated with the punches and designed for the guided axial traversing of the latter in the relative housings, In the aforementioned precompression and compression stations the mutual position of the said working heads is governed by fixed means (rollers) for the synchronized interception of the external heads of the punches of each corresponding pair of punches: in the last two stations these operating means are inoperative.

In correspondence with the infeed station the working head of the upper punch is higher than the said pate, whereas the working head of the lower punch is inserted in the cavity at a preset distance (depth) from the said plate: this permits the loading of the cavity.

In fact the material in powder or granular form is conveyed to this plate, in correspondence with the infeed station.

The loading of the cavity occurs mainly by gravity; suitable impellers are fitted to move the material in correspondence with the infeed stations to favour the channelling of the material towards the cavities transiting below the same station.

In the dosing station a fixed blade, scraping on the plate, in cooperation with the working head of the tower punch relative to the transiting cavity below the same blade, defines (at least theoretically) the volume of material inside this same cavity; the value of the said volume is a function of the value of the depth of the working head of the lower punch with respect to the aforementioned plate.

Since cavity infeed occurs mainly by gravity, infeed becomes increasingly more difficult with the increase in turret speed, this hinders the tilling of the cavity, and thus represents an upper limit to the productivity of known compressing machines for making tablets.

The heating of powdered material, caused by the action of the impellers and the blade, can, in extreme cases, lead to the formation of hard deposits with the consequent blocking of the machine and the relative drawbacks which this involves.

Another compressing machine for making tablets is covered by the English patent numbers: G.B. Pat. Nos. 1,481,797, 1,481,798.

In this machine the cavities are arranged radially with respect to the turret axis, the inside punch is moved radially by means of a circular cam, eccentric with respect to the turret axis, whereas the radial motion of the external punch is provided by the action of a flexible ring, rotating with the turret, forced and guided by angularly spaced rollers, which define a non-circular profile for the same ring.

The powder or granular material is conveyed onto a concave surface from which it is subsequently transferred, by means of deflectors, into a circular channel.

The first portion (approximately 160 degrees) this channel forms a zone where the internal ends of the cavities pass, whereas for the remaining portion of the circle, the same channel is displaced with respect to the said ends; other deflectors connect the aforementioned portions and aid the transit of material along the latter. Cavity infeed, in correspondence with the said first portion, is facilitated by two factors: gravity and centrifugal force.

The first of the aforementioned rollers, in cooperation with the said fixed cam, is designed for dosing the material inside the cavity.

The second of the aforementioned rollers, in cooperation with the fixed cam, is designed for the compression of the material with definition of the thickness of the tablet.

Another one of the aforementioned rollers is designed for the expulsion of the tablet from the cavity.

The compressing machine just described is complex, difficult to produce, requires accurate setting up and frequent maintenance, all of which add up to investment and running costs much higher than the other known compressing machines for making tablets,

SUMMARY OF THE INVENTION

The purpose of the present invention is that of offering a compressing machine for the production of tablets, built in such a way as to effectively exploit the centrifugal force resulting from the rotation of the turret, defined by means of a simple mechanical solution, at the same time functional and reliable, which overcomes the problems of known machines permitting, moreover, a much higher productivity than the productivity of the alter.

The above may be obtained, in accordance with the invention, by means of a tablet compressing machine of the type consisting of: a turret driven to rotate around its own axis; a cavity plate, locked to the turret, whose cavities consist of holes the axes of which are parallel to the turret axis and arranged along a circumference that is coaxial to the latter axis; a pair of punches for each cavity, with the upper and lower punches of each pair smoothly guided by an equal number of housings made in the turret on opposite sides of the relative cavities and coaxial to the latter, the working heads of the punches of each pair of punches being opposed and such that they fit in a complementary way in the relative cavity: means to move and guide the punches of each pair, designed to adjust the mutual distance between the working heads of the same punches for an entire working cycle defined by a preset arc. described by any cavity, with an angular span which is at least equal to a submultiple of the circle: an infeed device for the material in powder or granular form; the aforementioned machine being characterized by the fact that it consists of: a cylindrical chamber made in the turret, coaxial to the axis of the latter, with the same chamber closed at the inside end and supplied, by means of the aforementioned device, with powder or granular material; a series of infeed channels in the turret and the cavity plate, starting from near the inside end of the said chamber and connecting the latter with the corresponding cavities, and by the fact of envisaging the aforementioned moving and guiding means designed, in cooperation with the working heads of each pair of punches, for the definition of the phases of the aforementioned working cycle.

Preferably the said channels are arranged in an equal number of radial directions with respect to the turret axis.

BRIEF DESCRIPTION OF THE DRAWINGS

While the specification concludes with claims which particularly point out and distinctly claim the subject matter forming the present invention, it is believed the invention will be better understood from the following description taken in conjunction with the accompanying drawings in which:

DESCRIPTION OF THE PREFERRED EMBODIMENT

Figure 1:
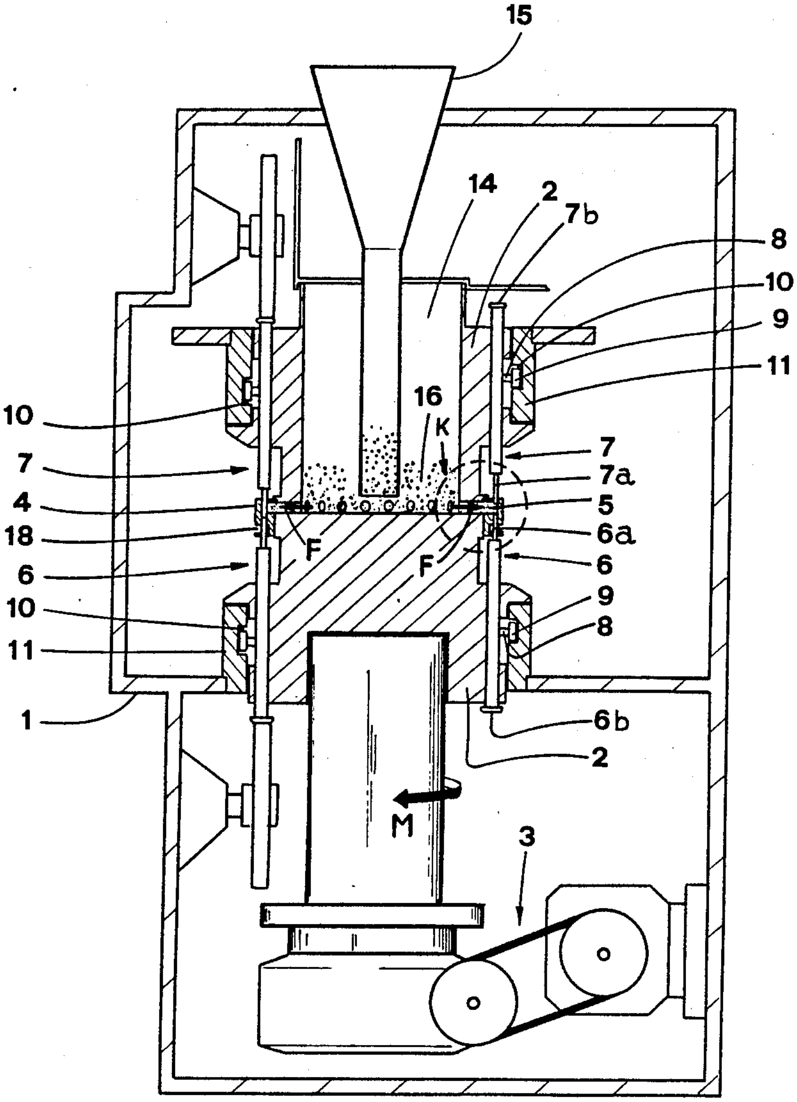
FIG. 1 is a cross-section, in a plane including the rotation axis of the turret, of the tablet-compressing machine according to the invention.

With reference to these figures, 1 indicates a supporting structure which provides a revolving support for a vertical turret 2; drive means 3 provide the turret 2 with a rotating movement (towards M).

Number 4 indicates a cavity plate externally locked to the turret in an intermediate position of the latter.

The cavities 5 in the said plate consist of through holes the axes of which are parallel to the axis of the turret 2, arranged along a circle coaxial to the axis of the turret and, finally, angularly equidistant from one another.

For each cavity 5 there are two punches 6,7 respectively lower and upper, guided by their corresponding housings in the turret on opposite sides of the cavity 5 and coaxial to the cavity.

The working heads 6*a*,7*a* of the punches of each pair are opposing and their diameter is not greater than the diameter of the cavity 5; in this way the same working heads can be inserted in the cavity.

The external heads 6*b*,7*b* of the punches 6,7 protrude from the relative heads of the turret.

The punches 6,7 are integral with corresponding pins 8, normal to the punch axes, on which an equal number of idle rollers 9 are mounted.

These rollers are placed in correspondence with the fixed, grooved cams 10 made in the inside face of drums 11 locked to the structure 1.

These cams act as guides for an angular portion Z1 of the circle described by each cavity 5 (see FIGS. 1, 2*a*, 2*b*, 2*c*, 2*d*, 2*e*), whereas in the remaining portion Z2 of this circle, they have a width greater than the diameter of the rollers 9 so that they do not come in contact with the latter (see FIGS. 1. 2*f*, 2*g*).

In correspondence with the portion Z2 the external heads 6*b*,7*b* of the punches intercept, in order, the rollers 12 of a first pair of rollers, and the rollers 13 (e.g. with a wider diameter than the previous ones) of a second pair of rollers; these rollers 12,13 are idle mounted on corresponding pins integral with the structure 1 (FIG. 1).

The combined action of the rollers 9, and the cams 10, in the Z1 portion, and the action of the rollers 12,13 on the heads 6*b*,7*b* in the Z2 portion, determine the axially guided traverse of the punches 6,7; in this way the mutual distance between the working heads 6*a*,7*a* of the punches of each pair is defined one by one.

The turret 2 contains a cylindrical chamber 14, coaxial to the turret closed in correspondence with its bottom; it must be underlined that the bottom is positioned in a diametric plane which is intermediate to the cavities 5 of the plate 4.

The bottom end of an infeed device, or hopper, 15 opens into the chamber 14 to supply the same chamber with suitable material 16 in a powder or granular form.

Between each cavity 5 and the chamber 14 there is an infeed channel 17 arranged in a radial direction with respect to the turret axis.

Each channel consists of two consecutive tracts 17*a*,17*b*, the first of which, with a constant cross-section, is in the turret wall (FIG. 3), whereas the second is in the plate 4.

Figure 3:
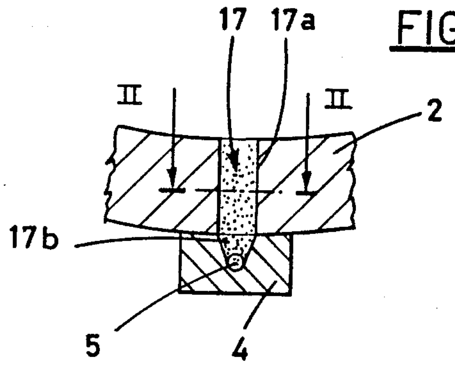
FIG. 3 illustrates the view of the section I—I as in FIG. 2*a;*
Figure 5:
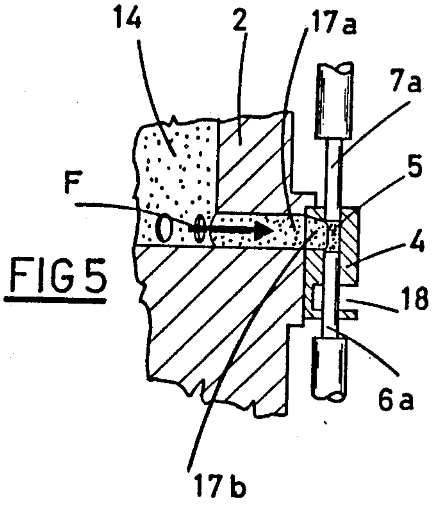
FIG. 5 is an enlargement of the detail K in FIG. 1.
Figure 4:
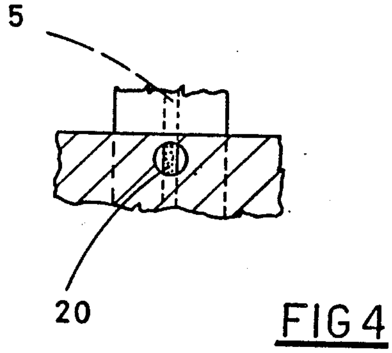
FIG. 4 illustrates the view of the section II—II in FIG. 3.

The second tract (see again FIG. 3) is shaped, starting from the first tract, to form a funnel and leads to the cavity 5 in correspondence with a section 20 connected with the cavity (see FIGS. 3 and 4).

The cavity plate 4, below the channels 17, has a ring-shaped groove 18, connected with the outside. through which the working heads 6*a* of the lower punches 6 pass.

Now the functioning of the aforementioned machine will be described.

The rotation of the turret (towards M) subjects the material 16 to a centrifugal force F; this leads to the filling of all the infeed channels 17 with the said material.

The working cycle phases involved in making a tablet 19 will be described, as a mere example and therefore does not imply any restriction, with particular reference to the FIGS. 2*a* and 2*g*.

As has been stated, the mutual distance between the working heads of the punches 6,7 is defined by the rollers 9 (guided by the fixed, grooved cams 10) in the portion Z1, and subsequently by the pairs of rollers 12,13 in the Z2 portion.

Figures 2A, 2B, 2C, 2D, 2E, 2F, 2G:
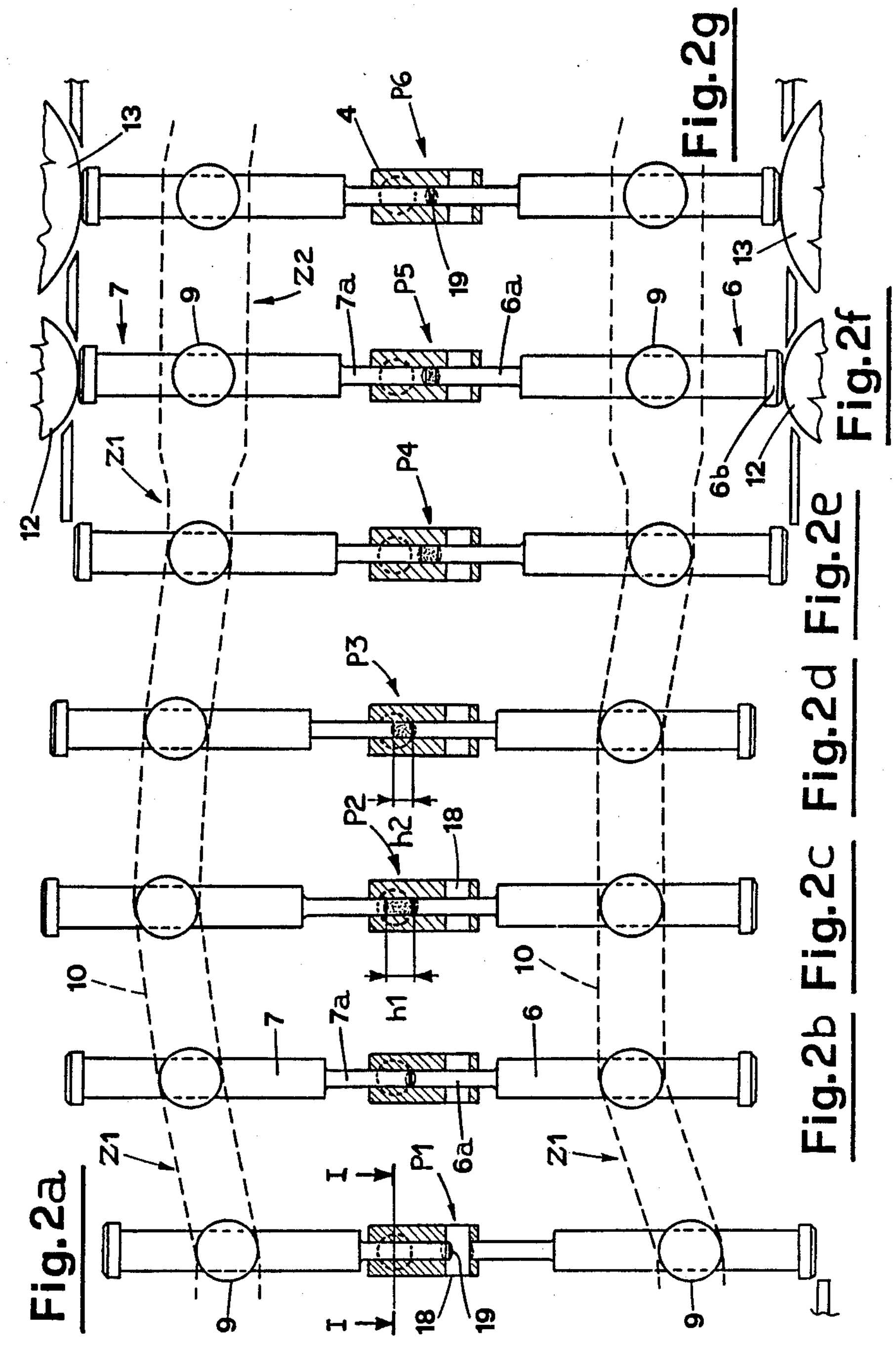
FIGS. 2*a* to 2*g* illustrate, diagramatically, and purely as an example, the stages of a working cycle, which can be obtained with the said machine, with which a tablet is made.

FIG. 2*a* illustrates a first characteristic position P1 of these heads 6*a*,7*a*; in this position the heads are spaced out in correspondence with the ring groove 18, and the working head 7*a* of the upper punch 7 is placed so that it closes the section 20 of the connection between the channel 17 and the cavity 5.

Subsequently, both the punches move upwards at different speeds to permit first the coming together of the said working heads (FIG. 2*b*) and subsequently the separation of the latter which, in a second characteristic position P2 (FIG. 2*c*) are positioned in the cavity 5 on opposite sides to the axis corresponding to the channel 17.

In this latter position the cavity 5, more precisely the space lying between the opposing working heads 6*a*,7*a*, is filled.

Filling takes place rapidly since the channel 17 is kept constantly full by the centrifugal force F and the effective action, always present (with the turret rotating) of the latter force which presses the material inside the cavity as soon as the section 20 is no longer obstructed by the working head 7*a* or the upper punch 7.

Dead times are nonexistent, since the material is always in correspondence with cavity 5; the time required for loading is equal to the technical time required to move a preset volume of material from channel 17 to cavity 5.

The centrifugal force increases as a square of the peripheral speed; as a result the filling of the preset volume of cavity 5 is positively influenced by the increase in speed. It should be emphasized that in known compressing machines for making tablets, the increase in turret speed has a negative influence on the cavity filling.

In the second characteristic position (FIG. 2*c*) the distance between the heads 6*a*,7*a* is equal to "h1".

In FIG. 2*d* a third characteristic position is illustrated P3 for the heads 6*a*,7*a*; in this position the distance between the said heads is equal to h2, less than h1.

The distance h2 defines the volume of the aliquot portion of the cavity 5 between the heads, in other words the volumetric dosage of the tablet being formed.

The value h2 is less than h1 to allow for any empty spaces in the material 16 which, in the positions P2,P3, is still subject to the centrifugal force F.

The fact that h2 is less than h1 is not in any way a restriction; in fact the values h1, h2 could be equal, or different.

After the position P3 of FIG. 2*d*, the punches 6,7 move downwards in synchrony; this transfers the dose of material previously predetermined below the axis of the channel 17: see FIG. 2*e* which illustrates a fourth characteristic position P4 set for the working heads 6*a*,7*a*. In the fourth characteristic position P4 the section 20 is closed by the working head 7*a* of the upper punch 7.

The rollers 9, after the definition of the fourth characteristic position P4, are no longer in contact with the relative grooved cam 10.

The rotation of the turret causes, down-stream of the last position P4, the interception of the external heads 6*b*,7*b* by the rollers 12 of the first pair of rollers; this causes the precompression of the dose of material placed between the working heads: fifth characteristic position P5 (FIG. 2*f*).

Subsequently the aforementioned external heads 6*b*,7*b* intercept the rollers 13 of the second pair of rollers; this causes the final compression of the dose of material: sixth characteristic position P6 for the working heads (FIG. 2*g*).

The reduction in the volume of the dose of material in two successive stages (precompression and final compression) reduces on the one hand the axial stresses on the punches and optimizes the degassing of the material thus compressed; the air which is released during these stages passes between the cavity and the punches.

In the positions of FIG. 2*g* the distance between the working heads 6*a*,7*a* defines the thickness of the tablet 19: at this point the formation of the taller is complete.

Downstream of the rollers 13 of the second pair of rollers, the rollers 9 are again subject to the action of the associated cams 10; this causes the downward movements of the punches 6,7 at different speeds so that the heads 6*a*,7*a* return again to the first characteristic position P1 (see FIG. 2*a*).

The tablet 19 is pushed into the race 18 by the upper punch 7; this race 18 acts, therefore, as the station which expels the tablet 19 from the cavity 5; suitable means, not illustrated, collect the tablet from the same race.

The material 16 in the machine described above is not handled in any way and therefore its relative temperature is not increased except in an imperceptible way; in this way the problems mentioned in the introduction associated with temperature increases in the material to be compressed are avoided.

With the machine described here the cavity 5 is filled by the centrifugal force, therefore any reduction in the flow properties of the material, due for example to traces of humidity, is compensated by the effective radial drive created by this force; in this way the limitations regarding the type of material used and its form, which may be either powder or granular, are reduced.

The rapidity of cavity filling should be underlined, this is due to two factors, i.e. the infeed channel 17 which is kept constantly full, thus reducing to a minimum the size of the movement of the material from the channel to the cavity, and the immediacy of this movement, as soon as the section 20 is at least partially open, due to the radial compression action exercised by the centrifugal force on the material in the infeed channel.

Another advantage is due to the fact that the increased speed of the turret has a markedly positive influence on the speed of cavity filling.

This is remarkable since it compensates for the reduced opening time of section 20 as a result of the increase in speed; in fact the centrifugal force increases as a square of the speed whereas the aforementioned time is reduced in a manner which is inversely proportional to the increase in speed.

This advantage permits the construction of tablet-compressing machines with a much higher productivity than that of known machines.

The filling of the cavities 5 by means of an equal number of radial channels 17, situated at the side of the same cavities, permits the placing of the expulsion station (in this case the race 18) in the optimum position according to the manufacturer, i.e. above or below cavity 5.

Since the cavities are filled from the side, the working heads 6*a*,7*a* of the punches are always engaged, at least partially, with the relative cavities; this limits noise and wear of the heads themselves and permits and increase in the speed of the punches (following an increase in the speed of the turret) without this having any considerable effect on the stresses, in particular bending stress as a consequence of the combined bending and compressive stress, borne by the punches.

The working cycle of the machine described takes place along an arc of 360 degrees: this cycle can also be obtained along a submultiple of 360 degrees: in this case in each cavity two or more tablets are produced for each revolution of the turret.

In the machine illustrated the turret has a vertical axis; this axis may however be sloping with respect to the vertical and in this case the centrifugal force contributing to the filling of the cavities is accumulated with the force of gravity component.

It is understood that everything described above is provided merely as an example and does not represent any restriction, thus any variations to the technical solution described above are to be intended as falling within the technical sphere of the invention as claimed below.

What is claimed is:

1. A compressing machine for the production of tablets, comprising: a base; a turret rotatable around its vertical axis mounted on said base, said turret defining a cylindrical chamber having a closed bottom coaxial with the axis of said turret; an annular cavity plate, fixed to said turret, with a plurality of holes through said annular cavity plate having axes parallel to the axis of said turret and spaced circularly in said annular cavity plate, said annular cavity plate defining means to expel the tablet; pairs of punches for each of said holes slidably mounted vertically on said turret, each of said pairs of punches comprising an upper and lower punch having a working head; guide means defined by said base for guiding the vertical sliding movement of said punches; said working head of each of said punches of each pair facing the working head of said other punch of said pair and positioned to fit simultaneously in said hole; an infeed device mounted on the base for introducing material in powder or granular form into said chamber; a radial channel defined by said turret and cavity plate extending from said chamber to each of said holes; and means to rotate the turret and thereby guide said punches of each pair, to allow the filling of a portion of each hole with material, the compressing of the material in each hole and the expelling of the tablet from the hole.

2. The machine according to claim 1 wherein said punches define external heads and including a first and second pair of rollers of different size mounted on said base, each said pair of rollers contacting the external heads of a pair of punches during a tablet forming cycle to force compression of said material but to a different degree.

3. The machine according to claim 1, wherein said guide means comprises a roller fitted to each one of said upper and lower punches and upper and lower grooved cams in said base.

4. The machine of claim 1 wherein each said infeed channel defined by the annular cavity plate is shaped like a funnel with the narrow portion terminating at the hole.

5. A machine according to claim 1, wherein said expulsion means consists of a ring-shaped race, made in said cavity plate, communicating with the outside of said cavity plate, through which said working head of one punch of each pair of punches transits.

* * * * *